Oct. 9, 1956 — A. E. WOOLFE — 2,765,572
FISH LURE
Filed Oct. 10, 1952 — 2 Sheets-Sheet 1
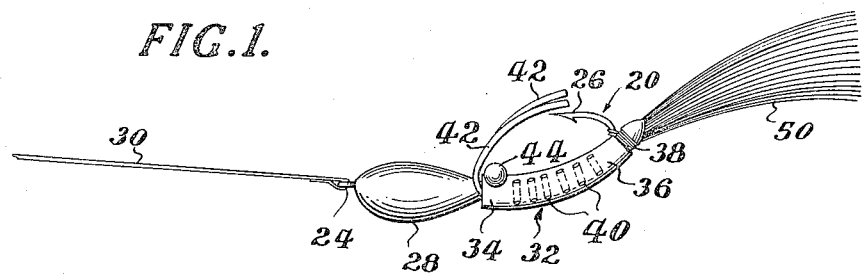
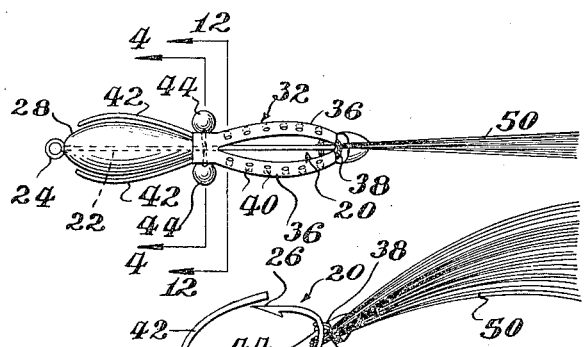
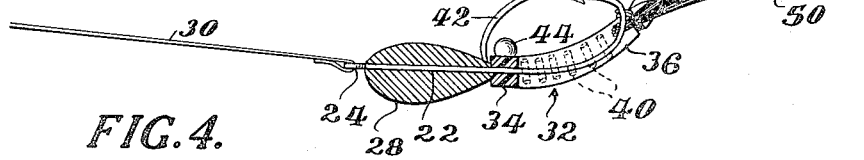
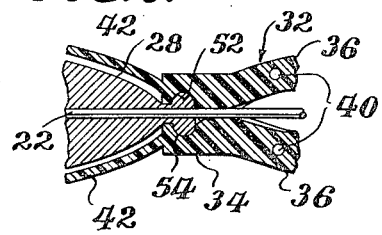
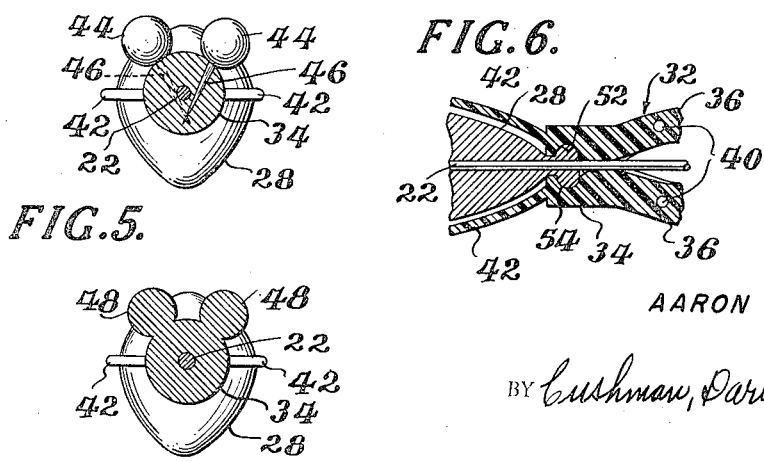
INVENTOR
AARON E. WOOLFE
BY Cushman, Darby & Cushman
ATTORNEYS

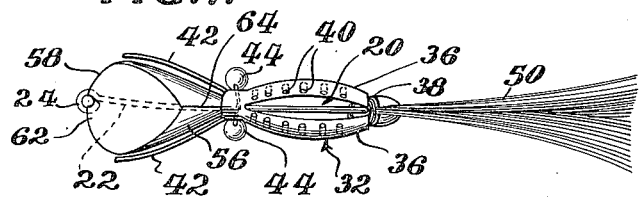
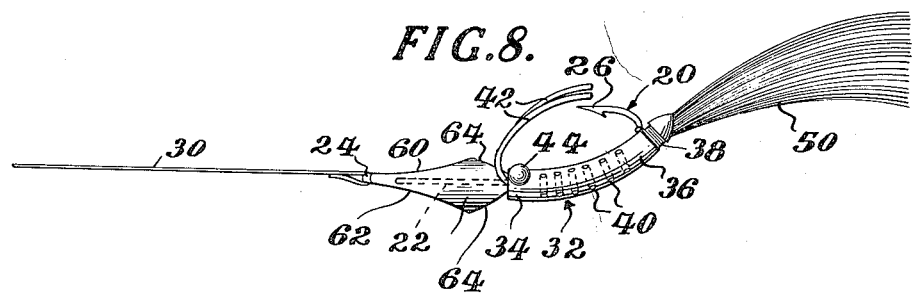
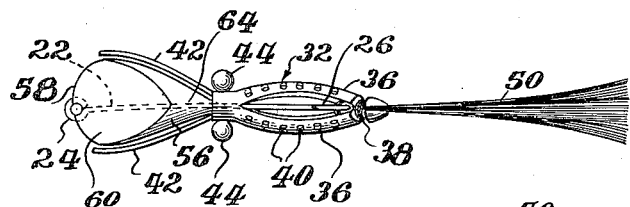
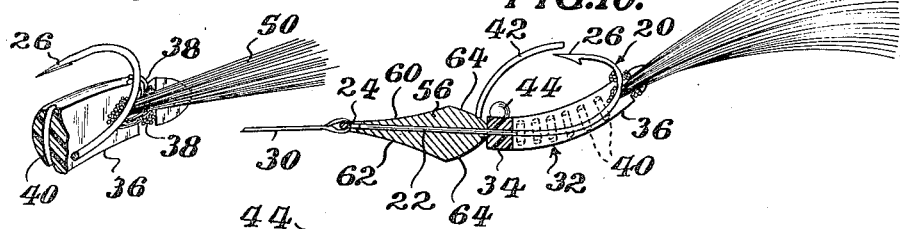
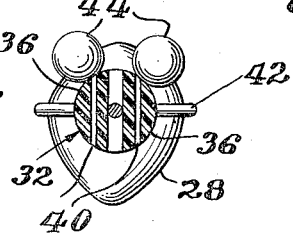

United States Patent Office 2,765,572
Patented Oct. 9, 1956

2,765,572
FISH LURE

Aaron Ernest Woolfe, Miami Beach, Fla., assignor, by mesne assignments, to Sam Mumford, Miami, Fla.

Application October 10, 1952, Serial No. 314,079

8 Claims. (Cl. 43—42.37)

This application relates to a fish lure of the type adapted to be secured to the end of a line and to be cast and retrieved by a fisherman. More particularly, this invention relates to an improved lure which has a number of advantages, among which are included economy in manufacture, a weedless feature, a water-agitating and bubble-producing feature, indestructibility, an extreme attractiveness to game fish, and the ability to reattract a fish after the same has seized the lure but has not been hooked thereby. This application is a continuation in part of my copending application, Serial No. 231,766, filed June 15, 1951 now abandoned.

Other advantages of the invention will be evident from the following description and accompanying drawings, in which:

Figure 1 is a side view of a lure embodying this invention, and illustrating the same attached to a line and being retrieved through water.

Figure 2 is a bottom view of the lure illustrated in Figure 1, but showing the same in non-retrieving condition.

Figure 3 is a longitudinal vertical sectional view of the lure illustrated in Figure 1.

Figure 4 is an enlarged transverse sectional view taken on the line 4—4 of Figure 3.

Figure 5 is a view corresponding to Figure 4 but illustrating a modification of the invention.

Figure 6 is an enlarged fragmentary horizontal sectional view through a lure embodying the invention and illustrating another modification thereof.

Figure 7 is a view corresponding to Figure 2 but illustrating another modified form of the invention.

Figure 8 is a view corresponding to Figure 1 and illustrating the modified form of the invention shown in Figure 7.

Figure 9 is a top view of the lure shown in Figure 7.

Figure 10 is a longitudinal sectional view of the lure illustrated in Figure 8.

Figure 11 is an enlarged fragmentary perspective view of the lure illustrated in Figure 1 showing constructional details.

Figure 12 is an enlarged transverse sectional view taken on line 12—12 of Figure 2.

Referring now to Figures 1, 2, and 3 of the drawings, the lure shown therein consists of a hook 20 having an elongated straight shank 22 provided with a line-attaching eyelet 24 at one end thereof, and at the other end thereof merging into a curved portion which terminates in a barbed point 26. Cast onto the shank 22 and extending from the eyelet 24 for a substantial distance rearwardly is a weighted head 28, preferably of lead or the like, which provides sufficient weight for casting the lure. The head 28 is generally of teardrop shape but of greater radial dimension on one side of the shank 22, as shown best in Figures 4 and 12, so that the center of gravity of the head is disposed on that side of the shank opposite the hook point 26. This construction results in causing the lure to travel through the water, when retrieved by an angler by a line 30 attached to the eyelet 24, in the position shown in Figure 1, i. e. with the point 26 of the hook 20 riding upright.

Secured to the hook 20 rearwardly of the head 28 is an elongated relatively-soft resilient transparent body, preferably formed of "Vinylite," a trade name for polyvinyl acetate, polyvinyl chloride acetate, and polyvinyl chloride synthetic resins, or similar plastic material. The body 32 is substantially circular in transverse section, as shown best in Figure 4, and is longitudinally axially slotted in the plane of the hook 20 and rearwardly of a short head portion 34 to provide two portions 36 which extend rearwardly on opposite sides of the hook, relative to the plane thereof. The short forward head portion 34 has a central bore or aperture therethrough which snugly receives the shank 22 of the hook, while the rear ends of the portions 36 are provided with circumferential notches or grooves on their outer sides for the reception of a thread-like wrapping 38 which binds the rearward ends of the portions 36 to each other and to the hook 20 at approximately the bight of the latter. From this construction it will be seen that the two portions 36 are curved to enclose substantially all of the hook 20 rearwardly of the head 28 except for a short effective curved section which includes the barbed point 26 and projects from between the portions 36. When the two ends of the portions 36 are secured by the wrapping 38, they are used pushed slightly forward so that the portions 36 are bowed outwardly on opposite sides of the hook 20, as shown best in Figure 2.

Each of the two portions 36 of the body 32 is provided with a longitudinal series of small transverse openings 40 extending vertically therethrough. The purpose and function of these openings will be later disclosed.

Integrally formed with the body 32 at the forward end thereof are two elongated feeler or antennae-like flexible appendages 42, one on each side of the body 32, relative to the plane of the hook 20, and extending forwardly on opposite sides of the head 28 for substantially the entire length of the latter, as shown best in Figures 2, 7, and 9. On the upper side of the short head portion 34 of the body and on opposite sides thereof, relative to the plane of the hook 20, are two bulbous eye-simulating projections 44 which may be formed, as shown best in Figure 4, by spherical-headed tacks having short pointed shanks 46 which are embedded in the plastic material forming the body 32. As illustrated in Figure 5, the simulation of eyes may also be provided by bulbous projections 48 formed integrally with the body 32 during the molding thereof.

For added fish-attractiveness, the lure may be provided with a tail of feathers, hair, Nylon strands 50, as shown in Figures 1 to 3, or other appropriate material. As best shown in Figure 11, these strands 50 may be looped, at their midpoint, about the bight of the hook 20 to extend and project rearwardly from between the rear ends of the two portions 36 of the body 32 and secured in place by the wrappings 38.

In use of the lure, an angler casts it outwardly by the line 30 and retrieves it with appropriate motion, e. g. jerks, in order to attract a game fish. As the lure strikes the water, the small openings 40 entrap air which is slowly released in the water to form escaping bubbles upon the retrieve. These bubbles serve as added attraction for a game fish. Additionally, the feeler-like appendages 42 are sufficiently flexible so that they are swept backward with their free ends disposed adjacent the point 26 of the hook on each side thereof. Hence, the appendages 42 not only provide the lure with a weedless feature in deflecting or fending off weeds and the like from the point 26 of the hook, but also the waving of the appendages during the retrieve provides an action which will substantially increase the probability of a strike by a game fish.

Referring now to Figure 6 of the drawings, there is shown a modification wherein the rear end of the head 28 is formed with a bulbous extension 52 coaxial with the shank 22, and the head portion 34 of the body is provided with a socket 54 for detachable reception of the bulbous extension 52. By means of this construction, the body 32 may be fastened more securely to the hook 20.

The modifications of the invention illustrated in Figures 1 to 5 all have a substantially teardrop-shaped head which causes the lure to be known in the vernacular of the angler as a "sinker," i. e. the lure sinks rather deep in the water on the retrieve. The lure may also be formed as what is known in the art as a "skimmer," i. e. provided with surfaces that give a planing effect upon the retrieve to cause the lure to rise upwardly and ride closely adjacent or on the surface of the water. This construction is illustrated in Figures 7 through 10. In this modification of the invention, the weighted head 56 is transversely broad at its forward portion and tapers rearwardly therefrom. In vertical section, as shown in Figure 10, the head 56 is substantially wedge-shaped for a considerable distance rearwardly from the front rounded edge 58 thereof, i. e. the upper and lower sides of the head are provided with rearwardly divergent slightly curved surfaces 60 and 62, respectively, the under surface 62 acting to provide the aforementioned planing effect to cause the lure to rise upwardly upon the retrieve. In this modification, however, the center of gravity of the head 56 again is disposed on that side of the hook shank 22 opposite the point 26 of the hook so that the point will ride in an upright position, as shown in Figure 8. The rear end of the head 56 is provided with upper and lower keel-like formations 64, and it will be noted that the hook eyelet 24 is somewhat laterally offset with respect to these keel-like formations. Because of this construction, this modification of the lure has a wiggling action in its passage through the water upon the retrieve.

It will be seen that all of the lure modifications may be provided with different colored heads, eyes, tails, and bodies, the different colored bodies being effected by dyeing the plastic forming the same before molding the bodies therefrom. In actual use, the lure has proven to be extremely attractive to all types of game fish, both fresh and salt water. An additional advantage of the lure arises from the fact that, if a fish strikes the plastic body 32 but is not hooked, it will come back for another pass since it has not been alarmed or discouraged by encountering a hard wooden or metal body but merely the soft plastic. The bowing of the portions 36 of the body 32 accent the "give" of the body for simulation of live food for a fish.

It thus will be seen that the objects of this invention have been fully and effectively accomplished. It will be realized, however, that various changes may be made in the specific examples shown and described to illustrate the principles of this invention without departing from such principles. Therefore, this invention includes all modifications encompassed by the spirit and scope of the following claims.

I claim:

1. A fish lure adapted to be cast and retrieved, comprising: a hook having a relatively long shank; an enlarged weighted metallic head surrounding and fixedly secured to said shank adjacent the end thereof; line-attaching means on one end of said head and shank; an elongated resilient relatively-soft axially-curved body formed of plastic material having one end thereof tightly surrounding said shank and bearing against the rear end of said head, said body being bifurcated rearwardly of said one body end to provide two body portions extending rearwardly on opposite sides of said hook, relative to the plane thereof, slightly beyond the bight of said hook; and means tightly securing the free ends of said two body portions to each other and to the bight of said hook.

2. The structure defined in claim 1 in which the body material is transparent, a portion thereof is substantially circular in transverse section, and has a longitudinal series of air-entrapping openings extending transversely through each rearwardly extending body portion.

3. The structure defined in claim 1 in which the rearwardly extending body portions are bowed outwardly on opposite sides of the hook.

4. The structure defined in claim 1 including a tail-like appendage secured to the lure by said securing means.

5. The structure defined in claim 1 including antennae-like flexible appendages of the same material as and integral with the body at the said one end thereof and of a length to be swept back and overlie the point of the hook on passage of the lure through the water.

6. The structure defined in claim 1 in which the front portion of the head is flattened and diverges rearwardly from a thin forward edge disposed perpendicular to the plane of the hook, and wherein the line-attaching means is at said edge.

7. The structure defined in claim 1 in which a lower surface of the head has a slightly curved form to cause a planing section upon retrieve of the lure.

8. The structure defined in claim 1 including a bulbous enlargement on the rear end of the head coaxial with the hook shank and connected to said head by a necked portion and in which the body has a complementary socket receiving said enlargement and snugly gripping said necked portion for detachably fastening said body to said head.

References Cited in the file of this patent

UNITED STATES PATENTS

| | | |
|---|---|---|
| D. 73,503 | Kinney | Sept. 20, 1927 |
| D. 121,694 | Nichols | July 30, 1940 |
| 1,394,313 | Leeper | Oct. 18, 1921 |
| 1,522,185 | Hawes | Jan. 6, 1925 |
| 1,855,097 | Chamberlaine | Apr. 19, 1932 |
| 2,036,954 | Murray | Apr. 7, 1936 |
| 2,218,280 | Deering | Oct. 15, 1940 |
| 2,258,080 | Thomas et al. | Oct. 7, 1941 |
| 2,309,902 | Harvey | Feb. 2, 1943 |
| 2,467,244 | Van Hee et al. | Apr. 12, 1949 |
| 2,523,831 | Koski | Sept. 26, 1950 |
| 2,563,522 | Fisher | Aug. 7, 1951 |
| 2,592,445 | McCarthy | Apr. 8, 1952 |
| 2,617,226 | Yoshii | Nov. 11, 1952 |

FOREIGN PATENTS

| | | |
|---|---|---|
| 23,862 | Great Britain | 1902 |
| 208,992 | Germany | 1909 |
| 849,916 | France | 1939 |